No. 655,315. Patented Aug. 7, 1900.
C. W. VAUGHAN.
SWIVEL PIPE JOINT.
(Application filed May 1, 1899. Renewed Jan. 8, 1900.)
(No Model.)
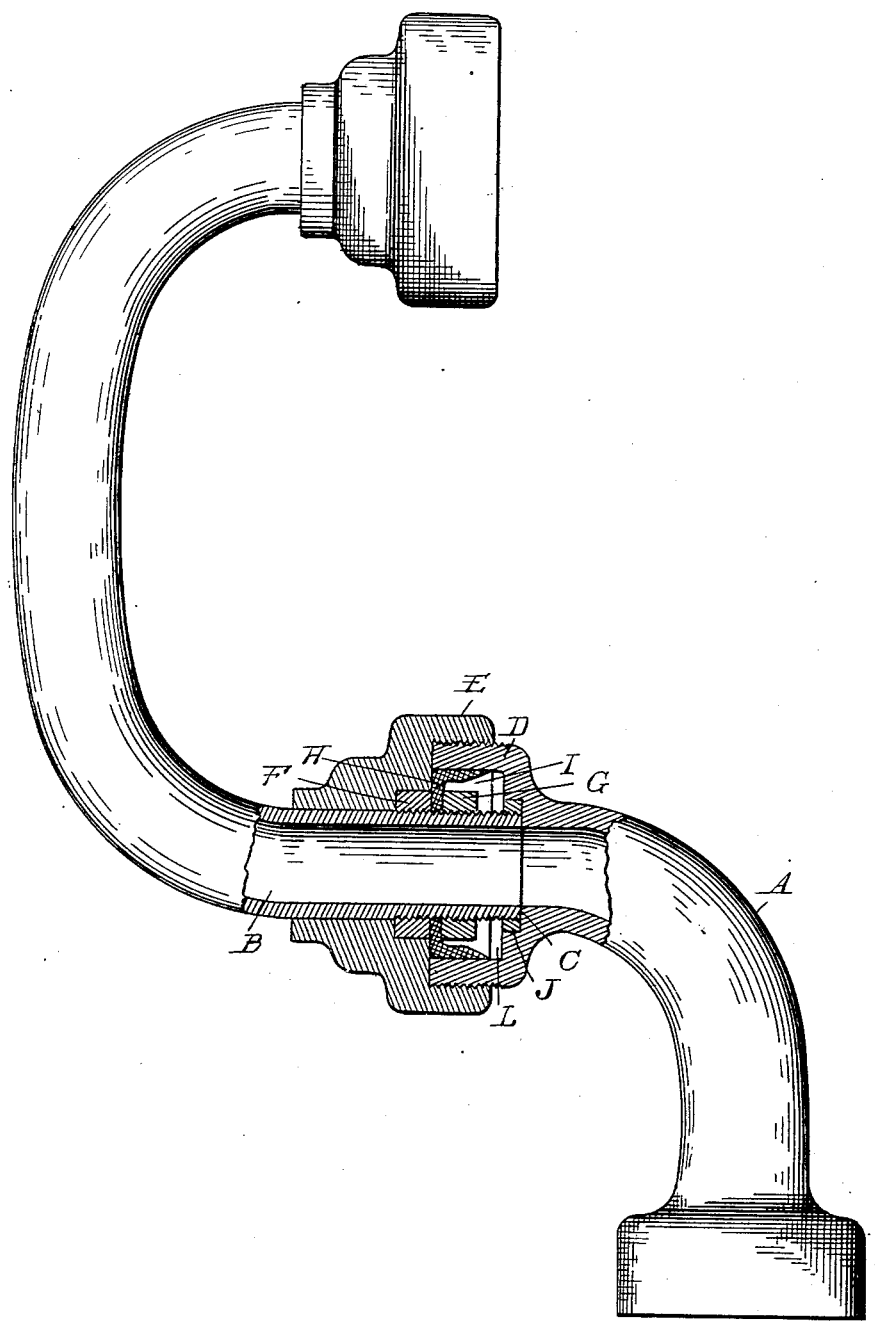
Witnesses
H. C. Smith.
M. Doherty.
Inventor
Charles W. Vaughan
By (signature)
Attys.

UNITED STATES PATENT OFFICE.

CHARLES W. VAUGHAN, OF HILLSDALE, MICHIGAN, ASSIGNOR OF ONE-FOURTH TO JOHN R. SUTTON, OF SAME PLACE.

SWIVEL PIPE-JOINT.

SPECIFICATION forming part of Letters Patent No. 655,315, dated August 7, 1900.

Application filed May 1, 1899. Renewed January 8, 1900. Serial No. 777. (No model.)

*To all whom it may concern:*

Be it known that I, CHARLES W. VAUGHAN, a citizen of the United States, residing at Hillsdale, in the county of Hillsdale and State of Michigan, have invented certain new and useful Improvements in Swivel Pipe-Joints, of which the following is a specification, reference being had therein to the accompanying drawings.

The invention consists in the construction of a swivel pipe-joint and in the construction, arrangement, and combination of the various parts, as more fully hereinafter described, and specifically pointed out in the claims.

I have shown two pipe-sections connected together by my improved swivel-joint, the joint being shown in longitudinal section.

I have shown an elbow A connected to a return-bend B by my joint in the drawings; but it is evident that straight pipe may be connected by it, and I shall refer to the members A and B as being the two pipe members connected by the joint. The member A is provided with a shoulder C, against which the end of the member B engages, so as to make a straight uninterrupted connection through the two members at the joint of the full diameter of either pipe. The member A is provided with a flange D, which extends forward and concentric with the aperture therethrough, and to this flange is connected the coupling-ring E, which embraces the pipe-section B and is shouldered or has a bearing-face for the ring F, which, with the ring G, is screwed upon the end of the pipe B and clamps between them the packing H. This packing H has a cup-shaped section I, which bears against the inner wall of the flange D, as plainly shown in the drawings.

I may, and preferably do, screw onto the end of the pipe B a ring J, which may be a packing-ring and which gives me a wider bearing to take up the end thrust and to make a better joint at that point.

The parts being thus constructed, it is evident that the inward movement of the pipe B is checked by the engagement of its end against the shoulder C, and the outward movement is checked by the ring F bearing against the shoulder of the coupling-ring E. It is also evident that any air or other gas or fluid leaking through the joint at C will enter the chamber L between the flange D and the pipe B, and, acting against the cup-shaped packing, I will force that packing tightly against the flange D and prevent the leakage of any fluid or air passing behind the cup-shaped packing I. It would have to pass over the ring F and through the joint between the pipe and the coupling-ring E in order to find exit, which makes a long and tortuous course.

In practice I find that the cup-shaped packing I, constructed as described, will make a tight joint, for the pressure within the chamber L will keep that cup-shaped packing tight against the flange D until the packing is practically worn out. This construction not only gives an unbroken passage through the joint, but is extremely simple to manufacture and especially desirable for such joints as are employed for railway-train pipes, &c.

What I claim as my invention is—

1. In a swivel pipe-coupling, the combination of two pipe-sections, one section having an offset shoulder against which the end of the other section engages and having a concentric flange extending beyond the joint, packing-rings upon the inner section clamping a cup-shaped packing between which bears against the inner face of the flange, and a coupling-ring screwed to the exterior of the flange and having a shouldered bearing engaging the face of the outer packing-ring, substantially as described.

2. In a swivel pipe-joint, the combination of two meeting pipe members or sections, a concentrically-arranged flange upon one section spaced from the meeting sections, a coupling upon the complementary pipe-section engaging the spaced flange and forming in connection with the latter an annular chamber-casing surrounding the sections, and a cup-shaped packing arranged within and occupying a portion of the annular chamber, said packing being carried by one of the sections and abutting against the meeting section.

3. In a swivel pipe-joint, the combination of two meeting pipe members or sections, a concentrically-arranged flange upon one section spaced from the meeting sections, a coupling upon the complementary pipe-section engaging the spaced flange and forming in connection with the latter an annular chamber-casing surrounding the sections, a cup-shaped packing arranged within and occupying a portion of the chamber, said packing being carried by one of the sections and abutting against the meeting section, and a detachable packing-ring upon the pipe-section carrying the coupling, bearing against the packing to clamp the same in position.

4. In a swivel pipe-joint, the combination of two meeting pipe members or sections, a concentrically-arranged flange upon one section, a coupling-ring upon the complementary pipe-section engaging the flange, two detachable packing-rings upon the latter section, one abutting against the coupling, and a cup-shaped packing clamped between the detachable packing-rings and abutting against the concentric flange.

In testimony whereof I affix my signature in presence of two witnesses.

CHARLES W. VAUGHAN.

Witnesses:
F. M. HALL,
ROY W. SMITH.